US007871727B2

(12) United States Patent
Obrovac et al.

(10) Patent No.: US 7,871,727 B2
(45) Date of Patent: *Jan. 18, 2011

(54) ALLOY COMPOSITION FOR LITHIUM ION BATTERIES (75) Inventors: Mark N. Obrovac, St. Paul, MN (US); Leif Christensen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 990 days.

This patent is subject to a terminal disclaimer.

(21) Appl. No.: 11/387,219

(22) Filed: Mar. 23, 2006

(65) Prior Publication Data
US 2007/0020522 A1 Jan. 25, 2007

Related U.S. Application Data (60) Provisional application No. 60/702,244, filed on Jul. 25, 2005.

(51) Int. Cl.
*H01M 4/58* (2010.01)
*H01M 4/88* (2010.01)
*C22C 29/00* (2006.01)

(52) U.S. Cl. .............................. 429/218.1; 429/231.95; 252/182.1; 420/578

(58) Field of Classification Search ................. 429/218, 429/231.95; 252/182.1; 420/578
See application file for complete search history.

(56) References Cited

U.S. PATENT DOCUMENTS

| 2,755,178 | A | 7/1956 | Rasmusen |
| 5,504,128 | A | 4/1996 | Mizutani et al. |
| 5,536,599 | A | 7/1996 | Alamgir et al. |
| 5,709,968 | A | 1/1998 | Shimizu |
| 5,763,119 | A | 6/1998 | Adachi |
| 5,858,573 | A | 1/1999 | Abraham et al. |
| 5,882,812 | A | 3/1999 | Visco et al. |
| 5,900,385 | A | 5/1999 | Dahn et al. |
| 6,001,507 | A | 12/1999 | Ono et al. |

(Continued)

FOREIGN PATENT DOCUMENTS

EP   0 883 199 A1   12/1998

(Continued)

OTHER PUBLICATIONS

Davies, "Metallic glass formation", *Amorphous Metallic Alloys*, Chapter 2, pp. 8-25, F. E. Luborsky, ed., Butterworth & Co., 1983.

(Continued)

*Primary Examiner*—Gregg Cantelmo
*Assistant Examiner*—Eugenia Wang
(74) *Attorney, Agent, or Firm*—Jean A. Lown; Stephen F. Wolf (57) ABSTRACT

Alloy compositions, lithium ion batteries, and methods of making lithium ion batteries are described. The lithium ion batteries have anodes that contain an alloy composition that includes a) silicon, b) aluminum, c) transition metal, d) tin, e) indium, and f) a sixth element that contains yttrium, a lanthanide element, an actinide element, or a combination thereof. The alloy composition is a mixture of an amorphous phase that includes silicon and a crystalline phase that includes an intermetallic compound of 1) tin, 2) indium, and 3) the sixth element.

22 Claims, 4 Drawing Sheets

U.S. PATENT DOCUMENTS

| | | | |
|---|---|---|---|
| 6,004,698 A | 12/1999 | Richardson et al. | |
| 6,045,952 A | 4/2000 | Kerr et al. | |
| 6,090,505 A | 7/2000 | Shimamura et al. | |
| 6,203,944 B1 | 3/2001 | Turner et al. | |
| 6,214,177 B1 | 4/2001 | Runkle | |
| 6,235,427 B1 | 5/2001 | Idota et al. | |
| 6,387,571 B1 | 5/2002 | Lain et al. | |
| 6,428,933 B1 | 8/2002 | Christensen et al. | |
| 6,432,585 B1 | 8/2002 | Kawakami et al. | |
| 6,436,578 B2 | 8/2002 | Turner et al. | |
| 6,506,520 B1 | 1/2003 | Inoue et al. | |
| 6,506,524 B1 | 1/2003 | McMillan et al. | |
| 6,548,208 B1 | 4/2003 | Kasamatsu et al. | |
| 6,551,744 B1 | 4/2003 | Ohzuku et al. | |
| 6,599,663 B2 | 7/2003 | Hashimoto et al. | |
| 6,680,145 B2 | 1/2004 | Obrovac et al. | |
| 6,699,336 B2 | 3/2004 | Turner et al. | |
| 6,730,434 B1 | 5/2004 | Kawakami et al. | |
| 6,806,003 B1 * | 10/2004 | Yamaguchi et al. | 429/232 |
| 6,949,312 B1 | 9/2005 | Kawakami et al. | |
| 6,964,828 B2 | 11/2005 | Lu et al. | |
| 7,078,128 B2 | 7/2006 | Lu et al. | |
| 7,169,328 B2 | 1/2007 | Miller et al. | |
| 2002/0031708 A1 | 3/2002 | Krause et al. | |
| 2002/0162606 A1 | 11/2002 | Turner et al. | |
| 2003/0108793 A1 | 6/2003 | Dahn et al. | |
| 2003/0134198 A1 | 7/2003 | Sawa et al. | |
| 2004/0058240 A1 | 3/2004 | Christensen | |
| 2004/0121234 A1 | 6/2004 | Le | |
| 2004/0179993 A1 | 9/2004 | Dahn et al. | |
| 2004/0241548 A1 * | 12/2004 | Nakamoto et al. | 429/231.95 |
| 2004/0248011 A1 * | 12/2004 | Asao et al. | 429/231.95 |
| 2005/0112054 A1 | 5/2005 | Eberman et al. | |
| 2005/0191556 A1 | 9/2005 | Kim et al. | |
| 2005/0221196 A1 | 10/2005 | Dahn et al. | |
| 2006/0099506 A1 | 5/2006 | Krause et al. | |
| 2006/0147802 A1 * | 7/2006 | Yasuda et al. | 429/233 |
| 2006/0263695 A1 | 11/2006 | Dahn et al. | |
| 2006/0263697 A1 | 11/2006 | Dahn et al. | |
| 2007/0020521 A1 * | 1/2007 | Obrovac et al. | 429/218.1 |

FOREIGN PATENT DOCUMENTS

| | | |
|---|---|---|
| EP | 1 028 476 A1 | 8/2000 |
| EP | 1 039 568 A1 | 9/2000 |
| EP | 1 274 140 A1 | 1/2003 |
| JP | 61-066369 | 4/1986 |
| JP | 10-046299 | 2/1998 |
| JP | 10208741 A | 8/1998 |
| JP | 2000-113912 | 4/2000 |
| JP | 2001-015102 | 1/2001 |
| JP | 2001-256974 | 9/2001 |
| JP | 2001-297757 | 10/2001 |
| JP | 2002-075351 | 3/2002 |
| JP | 2003-346793 | 12/2003 |
| JP | 2004-193005 | 7/2004 |
| WO | WO 94/11138 | 5/1994 |
| WO | WO 99/49532 | 9/1999 |
| WO | WO 00/14817 | 3/2000 |
| WO | WO 00/33402 | 6/2000 |
| WO | WO 01/29920 A1 | 4/2001 |
| WO | WO 01/52337 A1 | 7/2001 |
| WO | WO 02/052664 A2 | 7/2002 |
| WO | WO 2004/086539 A1 | 10/2004 |
| WO | WO 2005/013397 A1 | 2/2005 |
| WO | WO 2006/028583 A2 | 3/2006 |

OTHER PUBLICATIONS

Wilson et al., "Lithium Insertion in Carbons Containing Nanodispersed Silicon", *J. Electrochem. Soc.*, vol. 142, No. 2, Feb. 1995, pp. 326-332.

Yang et al., "Small particle size multiphase Li-alloy anodes for lithium-ion-batteries", *Solid State Ionics* 90 (1996) 281-287.

Besenhard et al., "Will advanced lithium-alloy anodes have a chance in lithium-ion batteries?", *Journal of Power Sources* 68 (1997) 87-90.

Dahn et al., "Economical Sputtering System To Produce Large-Size Composition-Spread Libraries Having Linear and Orthogonal Stoichiometry Variations", *Chem. Mater.*, 14, 2002, pp. 3519-3523.

Egashira et al., "Properties of containing Sn nanoparticles activated carbon fiber for a negative electrode in lithium batteries", *Journal of Power Sources* 107 (2002) 56-60.

Beaulieu et al., "The Electrochemical Reaction of Li with Amorphous Si-Sn Alloys", *J. Electrochem. Soc.*, 150 (2) A149-A156 (2003).

Cumyn et al., "Design and Testing of a Low-Cost Multichannel Pseudopotentiostat for Quantitative Combinatorial Electrochemical Measurements on Large Electrode Arrays", *Electrochemical and Solid-State Letters*, 6 (6) E15-E18 (2003).

Fleischauer et al., "Design and Testing of a 64-Channel Combinatorial Electrochemical Cell", *J. Electrochem. Soc.*, 150 (11) A1465-A1469 (2003).

Sakaguchi et al., "Ce-Sn intermetallic compounds as new anode materials for rechargeable lithium batteries", *Journal of Power Sources* 119-121 (2003) 50-55.

Tirado, "Inorganic materials for the negative electrode of lithium-ion batteries: state-of-the-art and future prospects", *Materials Science and Engineering R* 40 (2003) 103-136.

Obrovac et al., "Structural Changes in Silicon Anodes during Lithium Insertion/Extraction", *Electrochemical and Solid-State Letter*, 7 (5) A93-A96 (2004).

Dahn et al., "The Impact of the Addition of Rare Earth Elements to $Si_{1-x}Sn_x$ Negative Electrode Materials for Li-Ion Batteries", *J. Electrochem. Soc.*, 153 (6) A1211-A1220 (2006).

* cited by examiner

ALLOY COMPOSITION FOR LITHIUM ION BATTERIES

RELATED APPLICATION

This application claims priority from U.S. Provisional Application No. 60/702,244, which was filed on Jul. 25, 2005 and is hereby incorporated by reference.

FIELD OF INVENTION

Alloy compositions for lithium ion batteries are described.

BACKGROUND

Rechargeable lithium ion batteries are included in a variety of electronic devices. Most commercially available lithium ion batteries have anodes that contain materials such as graphite that are capable of incorporating lithium through an intercalation mechanism during charging. Such intercalation-type anodes generally exhibit good cycle life and coulombic efficiency. However, the amount of lithium that can be incorporated per unit mass of intercalation-type material is relatively low.

A second class of anode material is known that incorporates lithium through an alloying mechanism during charging. Although these alloy-type materials can often incorporate higher amounts of lithium per unit mass than intercalation-type materials, the addition of lithium to the alloy is usually accompanied with a large volume change. Some alloy-type anodes exhibit relatively poor cycle life and coulombic efficiency. The poor performance of these alloy-type anodes may result from the formation of a two-phase region during lithiation and delithiation. The two-phase region can create internal stress within the alloy if one phase undergoes a larger volume change than the other phase. This internal stress can lead to the disintegration of the anode material over time.

Further, the large volume change accompanying the incorporation of lithium can result in the deterioration of electrical contact between the alloy, conductive diluent (e.g., carbon) particles, and binder that typically form the anode. The deterioration of electrical contact, in turn, can result in diminished capacity over the cycle life of the anode.

SUMMARY

Alloy compositions, lithium ion batteries, and methods of making lithium ion batteries are provided. More specifically, the lithium ion batteries have anodes that contain an alloy composition that is a mixture of an amorphous phase and a nanocrystalline phase.

In one aspect, a lithium ion battery is described that contains a cathode, an anode, and an electrolyte that is in electrical communication with both the anode and the cathode. The anode includes an alloy composition that contains (a) silicon in an amount of 35 to 70 mole percent, (b) aluminum in an amount of 1 to 45 mole percent, (c) a transition metal in an amount of 5 to 25 mole percent, (d) tin in an amount of 1 to 15 mole percent, (e) indium in an amount up to 15 mole percent, and (f) a sixth element that includes yttrium, a lanthanide element, an actinide element, or a combination thereof in an amount of 2 to 15 mole percent. Each mole percent is based on a total number of moles of all elements except lithium in the alloy composition. The alloy composition is a mixture of an amorphous phase that includes silicon and a nanocrystalline phase that includes tin, indium, and the sixth element.

In another aspect, a method of making a lithium ion battery is described that includes preparing an anode that contains an alloy composition, providing a cathode, and providing an electrolyte that is in electrical communication with both the anode and the cathode. The alloy composition contains (a) silicon in an amount of 35 to 70 mole percent, (b) aluminum in an amount of 1 to 45 mole percent, (c) a transition metal in an amount of 5 to 25 mole percent, (d) tin in an amount of 1 to 15 mole percent, (e) indium in an amount up to 15 mole percent, and (f) a sixth element that includes yttrium, a lanthanide element, an actinide element, or a combination thereof in an amount of 2 to 15 mole percent. Each mole percent is based on a total number of moles of all elements except lithium in the alloy composition. The alloy composition is a mixture of an amorphous phase that includes silicon and a nanocrystalline phase that includes tin, indium, and the sixth element.

In yet another aspect, an alloy composition is described. The alloy composition contains (a) silicon in an amount of 35 to 70 mole percent, (b) aluminum in an amount of 1 to 45 mole percent, (c) a transition metal in an amount of 5 to 25 mole percent, (d) tin in an amount of 1 to 15 mole percent, (e) indium in an amount up to 15 mole percent, and (f) a sixth element that includes yttrium, a lanthanide element, an actinide element, or a combination thereof in an amount of 2 to 15 mole percent. Each mole percent is based on a total number of moles of all elements except lithium in the alloy composition. The alloy composition is a mixture of an amorphous phase that includes silicon and a nanocrystalline phase that includes tin, indium, and the sixth element.

As used herein, the terms "a", "an", and "the" are used interchangeably with "at least one" to mean one or more of the elements being described.

The term "amorphous" refers to a material that lacks the long-range atomic order characteristic of crystalline material, as determined using x-ray diffraction techniques.

The terms "crystalline", "crystallite", and "crystals" refer to materials that have long-range order as determined using x-ray diffraction techniques. The crystalline materials have a maximum dimension of at least about 5 nanometers. The terms "nanocrystalline", "nanocrystallite", and "nanocrystals" refer to a subset of crystalline materials that have a maximum dimension of about 5 to about 50 nanometers. Some crystalline materials are larger than nanocrystalline materials (i.e., some have a maximum dimension larger than about 50 nanometers).

The term "electrochemically active" refers to a material that reacts with lithium under conditions typically encountered during charging of a lithium ion battery. The electrochemically active material is usually in the form of a metal or alloy.

The term "electrochemically inactive" refers to a material that does not react with lithium under conditions typically encountered during charging of a lithium ion battery.

The electrochemically inactive material is usually in the form of a metal or alloy.

The term "metal" refers to both metals and metalloids such as silicon and germanium. The metal is often in an elemental state. An "intermetallic" compound is a compound containing at least two metals.

The term "lithiation" refers to the process of adding lithium to the alloy composition (i.e., lithium ions are reduced).

The term "delithiation" refers to the process of removing lithium from the alloy composition (i.e., lithium atoms are oxidized).

The term "charging" refers to a process of providing electrical energy to a battery.

The term "discharging" refers to a process of removing electrical energy from a battery (i.e., discharging is a process of using the battery to do useful work).

The term "capacity" refers to the amount of lithium that can be incorporated into the anode material (e.g., the alloy composition) and has units of milliamp-hours (mAh).

The term "specific capacity" refers to the capacity per unit mass of the anode material and has units of milliamp-hour/gram (mAh/g).

The term "cathode" refers to the electrode where electrochemical reduction occurs during the discharging process. During discharging, the cathode undergoes lithiation. During charging, lithium atoms are removed from this electrode.

The term "anode" refers to the electrode where electrochemical oxidation occurs during the discharging process. During discharging, the anode undergoes delithiation. During charging, lithium atoms are added to this electrode.

As used herein, a "number in the range of" includes the endpoints of the range and all the numbers between the endpoints. For example, a number in the range of 1 to 10 includes 1, 10, and all the numbers between 1 and 10.

The above summary is not intended to describe each disclosed embodiment or every implementation of the present invention. The detailed description section that follows more particularly exemplifies these embodiments.

BRIEF DESCRIPTION OF THE DRAWINGS

The invention can be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Alloy compositions are described that can be included in the anode of a lithium ion battery. The alloy compositions are a mixture of an amorphous phase and a nanocrystalline phase. Compared to materials that contain large crystallites (i.e., crystals having a maximum dimension greater than about 50 nanometers), this mixture can advantageously decrease the risk of anode disintegration over time due to internal stress within the alloy composition. Additionally, compared to materials that are entirely amorphous, this mixture can advantageously result in anodes having an increased rate of lithiation. Anodes having an increased rate of lithiation can be recharged at a faster rate.

In one aspect, lithium ion batteries are provided that include a cathode, an anode, and an electrolyte that is in electrical communication with both the cathode and the anode. The alloy composition contains (a) silicon, (b) aluminum, (c) a transition metal, (d) tin, (e) indium, and (f) a sixth element that includes yttrium, a lanthanide element, an actinide element, or a combination thereof. The amorphous phase contains silicon while the nanocrystalline phase is substantially free of silicon. The nanocrystalline phase contains an intermetallic compound that includes (1) tin, (2) indium, and (3) the sixth element.

The amorphous nature of the alloy compositions can be characterized by the absence of sharp peaks in the x-ray diffraction pattern. The x-ray diffraction pattern can have broad peaks, such as peaks having a peak width at half the maximum peak height corresponding to at least 5 degrees two theta, at least 10 degrees two theta, or at least 15 degrees two theta using a copper target (i.e., copper K$\alpha$1 line, copper K$\alpha$2 line, or a combination thereof).

Nanocrystalline materials typically have a maximum dimension of about 5 nanometers to about 50 nanometers. The crystalline size can be determined from the width of an x-ray diffraction peak using the Sherrer equation. Narrower x-ray diffraction peaks correspond to larger crystal sizes. The x-ray diffraction peaks for nanocrystalline materials typically have a peak width at half the maximum peak height corresponding to less than 5 degrees two theta, less than 4 degrees two theta, less than 3 degrees two theta, less than 2 degrees two theta, or less than 1 degree two theta using a copper target (i.e., copper K$\alpha$1 line, copper K$\alpha$2 line, or a combination thereof). The nanocrystalline material has a peak width at half of the maximum peak height corresponding to at least 0.2 degrees two theta, at least 0.5 degrees two theta, or at least 1 degree two theta using a copper target.

Because the rate of lithiation is generally greater for nanocrystalline material than for amorphous material, it is desirable to include some nanocrystalline material in the alloy composition. The presence of elemental silicon in a crystalline phase, however, can result in the formation of crystalline $Li_{15}Si_4$ during cycling when the voltage drops below about 50 mV versus a metallic Li/Li ion reference electrode. The formation of crystalline $Li_{15}Si_4$ during lithiation can adversely affect the cycle life of the anode (i.e., the capacity tends to diminish with each cycle of lithiation and delithiation). To minimize or prevent the formation of $Li_{15}Si_4$ crystals, it is advantageous for silicon to be present in the amorphous phase and to remain in the amorphous phase after repetitive cycles of lithiation and delithiation. The addition of a transition metal facilitates the formation of an amorphous silicon-containing phase and minimizes or prevents the formation of a crystalline silicon-containing phase (e.g., crystalline elemental silicon or crystalline silicon-containing compounds).

The nanocrystalline phase of the alloy composition includes tin, which is another electroactive material, rather than silicon. The presence of crystalline elemental tin, however, can be detrimental to the capacity when the anode is subjected to repetitive cycles of lithiation and delithiation. As used herein, the term "elemental" refers to an element of the periodic table (e.g., tin, silicon, indium, or the like) that is present in an elemental form (i.e., as a pure element) rather than combined with another element in the form of a compound such as an intermetallic compound.

To minimize the formation of crystalline elemental tin, an intermetallic compound is formed that contains (1) tin, (2) indium, and (3) a sixth element that contains yttrium, a lanthanide element, an actinide element, or a combination thereof are added to the alloy composition. The intermetallic compound can be, for example, of formula $[Sn_{(1-x)}In_x]_3M$ where M is an element that contains yttrium, a lanthanide element, an actinide element, or a combination thereof and x is a positive number less than 1. In the absence of the indium and the sixth element, it can be difficult to control the crystalline size using some formation processes. For example, when an alloy is formed using a melt spinning technique without any of the sixth element or indium, relatively large crystals of elemental tin can form.

Indium tends to impede the formation of crystalline elemental tin and increases the capacity of the alloy composition. Additionally, the addition of indium tend to facilitate the use of melt processing techniques such as melt spinning to form the alloy composition and increases the likelihood that an amorphous phase will form rather than a large crystalline phase.

The alloy composition includes an amorphous phase that includes all of the silicon. The amorphous phase typically includes all or a portion of the aluminum and all or a portion of the transition metal. The alloy further includes a nanocrystalline phase that includes an intermetallic compound containing tin, indium, and the sixth element. The nanocrystalline phase can include all or a portion of the tin, all or a portion of the indium, and all or a portion of the sixth element. The nanocrystalline phase is substantially free of elemental tin, elemental silicon, elemental indium, and an indium-tin binary intermetallic compound. As used herein, the term "substantially free" when referring to the nanocrystalline phase means that the substance (e.g., elemental silicon, elemental tin, elemental indium, or the indium-tin binary intermetallic compound) cannot be detected using x-ray diffraction techniques.

The specific capacity (i.e., the capacity per gram) of the alloy compositions is usually at least 200 mAh/g. In some embodiment, the specific capacity can be at least 400 mAh/g, at least 600 mAh/g, at least 800 mAh/g, at least 1000 mAh/g, at least 1200 mAh/g, at least, at least 1600 mAh/g, or at least 2000 mAh/g. The specific capacity is typically measured during the discharging portion of the second cycle of lithiation and delithiation.

As used herein, the term "mole percent" when referring to constituents of the alloy composition is calculated based on a total number of moles of all elements in the alloy composition except lithium. For example, the mole percent silicon in an alloy that contains silicon, aluminum, transition metal, tin, indium, and a sixth element is calculated by multiplying the moles of silicon by 100 and dividing this product by the total moles of all elements except lithium in the alloy composition (e.g., moles of silicon+moles of aluminum+moles of transition metal+moles of tin+mole of indium+moles of sixth element).

All of the silicon is generally in the amorphous phase. Silicon is present in the alloy composition in an amount of 35 to 70 mole percent based on the total number of moles of all elements except lithium in the alloy composition. If the amount of silicon is too low, the capacity can be unacceptably low. If the amount of silicon is too high, however, silicon-containing crystals tend to form. The presence of crystalline silicon, at least in some embodiments, can lead to the formation of $Li_{15}Si_4$ during cycling when the voltage drops below about 50 mV versus a metallic Li/Li ion reference electrode. Crystalline $Li_{15}Si_4$ can detrimentally affect the cycle life of a lithium ion battery.

The alloy composition contains at least 35 mole percent, at least 45 mole percent, at least 50 mole percent, at least 55 mole percent, or at least 60 mole percent silicon. The alloy composition can contain up to 70 mole percent, up to 65 mole percent, or up to 60 mole percent silicon. For example, the alloy composition can contain 40 to 70 mole percent, 50 to 70 mole percent, 55 to 70 mole percent, or 55 to 65 mole percent silicon.

Aluminum is another element that is present in the alloy composition. The aluminum is typically present in the amorphous phase and, along with the transition metal, facilitates the formation of the amorphous phase that contains all of the silicon. The aluminum can be electrochemically active, electrochemically inactive, or a combination thereof. If the aluminum is present as elemental aluminum, it is often electrochemically active. Electrochemically active aluminum can enhance the capacity of the alloy composition. If the aluminum is present as an intermetallic compound with a transition metal, however, it can be electrochemically inactive. As an electrochemically inactive material, an aluminum intermetallic compound can function as a matrix for the electrochemically active components.

Aluminum is present in the alloy composition in an amount of 1 to 45 mole percent based on the total number of moles of all elements except lithium in the alloy composition. The addition of aluminum to the alloy composition often lowers the melting point, which can facilitate the use of various melt processing technique such as melt spinning to form the alloy composition. Melt processing techniques are often less expensive than techniques such as sputtering. If the aluminum level is too low, it can be more difficult to form an amorphous phase that contains all of the silicon. Too much aluminum, however, can detrimentally affect the cycle life of the lithium ion battery. That is, too much aluminum can result in an unacceptably large capacity decrease when the anode is subjected to repetitive cycles of lithiation and delithiation.

The alloy composition contains up to 45 mole percent, up to 40 mole percent, up to 35 mole percent, up to 30 mole percent, up to 25 mole percent, up to 20 mole percent, or up to 15 mole percent aluminum. The aluminum in the alloy composition is often present in an amount of at least 1 mole percent, at least 2 mole percent, at least 5 mole percent, or at least 10 mole percent. For example, the alloy composition can contain 2 to 40 mole percent, 3 to 40 mole percent, 5 to 40 mole percent, 10 to 40 mole percent, 10 to 30 mole percent, or 10 to 20 mole percent aluminum.

The alloy composition also includes a transition metal in an amount of 5 to 25 mole percent based on the total number of moles of all elements except lithium in the alloy composition. Suitable transition metals include, but are not limited to, titanium, vanadium, chromium, manganese, iron, cobalt, nickel, copper, zirconium, niobium, molybdenum, tungsten, and combinations thereof. The transition metal, in combination with aluminum, facilitates the formation of the amorphous phase. If too little transition metal is included in the alloy composition, it can be more difficult to form an amorphous phase that includes all of the silicon. If the transition metal concentration is too high, however, the capacity of the alloy composition can be unacceptably low because the transition metal is electrochemically inactive or combines with other components such as aluminum to form an intermetallic compound that is electrochemically inactive.

The transition element is present in an amount of at least 5 mole percent, at least 8 mole percent, at least 10 mole percent, or at least 12 mole percent. The alloy composition contains up to 25 mole percent, up to 20 mole percent, or up to 15 mole percent transition metal. For example, the alloy composition includes 5 to 20 mole percent, 5 to 15 mole percent, 8 to 25 mole percent, 8 to 20 mole percent, or 10 to 25 mole percent transition metal.

Tin is yet another element present in the alloy composition. Tin is typically present in the nanocrystalline phase as an intermetallic compound with (1) indium and (2) a sixth metal that contains yttrium, a lanthanide element, an actinide element, or a combination thereof. The nanocrystalline material is often of formula $[Sn_{(1-x)}In_x]_3M$ where M is an element that contains yttrium, a lanthanide element, an actinide element, or a combination thereof and x is a positive number less than 1. Depending on the relative ratios of tin, indium, and the sixth element, multiple nanocrystalline materials can be present in the alloy composition. For example, the nanocrystalline material can include $Sn_3M$, $In_3M$, or both in addition to $[Sn_{(1-x)}In_x]_3M$.

The nanocrystalline phase can increase the rate of lithiation of the alloy composition, particularly during the first cycle of lithiation and delithiation. Although not wanting to be bound by theory, the nanocrystalline phase may be analogous to veins through the amorphous phase. The nanocrystalline phase may provide a conduction path for lithium throughout the alloy composition, which may allow lithium to diffuse quickly along the grain boundaries between the nanocrystalline phase and the amorphous phase.

The alloy composition contains 1 to 15 mole percent tin based on the total number of moles of all elements except lithium in the alloy composition. If too much tin is present, crystalline tin can form rather than a nanocrystalline tin-containing, intermetallic compound. Crystalline elemental tin detrimentally affects the capacity when the anode is subjected to repetitive cycles of lithiation and delithiation. That is, too much tin can cause the capacity to decrease unacceptably when the anode is subjected to repetitive cycles of lithiation and delithiation. If the amount of tin is too low, however, the rate of lithiation may be comparable to that of an amorphous material.

Tin is present in an amount up to 15 mole percent, up to 12 mole percent, up to 10 mole percent, up to 9 mole percent, up to 8 mole percent, up to 7 mole percent, up to 6 mole percent, or up to 5 mole percent. Tin is usually present in an amount of at least 1 mole percent, at least 2 mole percent, at least 3 mole percent, at least 4 mole percent, or at least 5 mole percent. For example, the alloy composition can contain 1 to 12 mole percent, 1 to 10 mole percent, 1 to 9 mole percent, 2 to 9 mole percent, 2 to 8 mole percent, or 3 to 9 mole percent tin.

Indium is present in the alloy composition in an amount up to 15 mole percent based on the total number of all elements except lithium in the alloy composition. Indium is part of the nanocrystalline phase in the form of an intermetallic compound that also includes tin and the sixth element. The alloy composition is typically substantially free of crystalline elemental indium. The alloy composition is typically substantially free of crystalline binary indium-tin intermetallic compounds such as $Sn_{(1-y)}In_y$ where y is a number less than 1 such as, for example, $Sn_{0.8}In_{0.2}$.

The presence of indium in the nanocrystalline intermetallic compound typically improves cycle life of the alloy composition. More specifically, indium improves the retention of the capacity after repeated cycles of lithiation and delithiation. If too much indium is present, crystalline elemental indium can form rather than a nanocrystalline intermetallic compound with tin and the sixth element. Crystalline elemental indium can disadvantageously lead to a decreased capacity when the anode is subjected to repetitive cycles of lithiation and delithiation.

The alloy composition often contains at least 0.1 mole percent, at least 0.2 mole percent, at least 0.5 mole percent, or at least 1 mole percent indium. The amount of indium in the alloy composition is often up to 15 mole percent, up to 12 mole percent, up to 10 mole percent, up to 8 mole percent, or up to 6 mole percent. For example, the alloy composition can contain 0.1 to 15 mole percent, 0.1 to 10 mole percent, 0.2 to 10 mole percent, 0.5 to 10 mole percent, 1 to 10 mole percent, or 2 to 10 mole percent indium.

A sixth element is included in the alloy composition that contains yttrium, a lanthanide element, an actinide element, or a combination thereof in an amount of 2 to 15 mole percent based on the total number of moles all elements except lithium in the alloy composition. The sixth element is included in the nanocrystalline phase and combines with tin and indium to form an intermetallic compound. If the alloy composition contains too much of the sixth element, the capacity can be reduced because the sixth element is typically electrochemically inactive. On the other hand, if the amount of the sixth element is too low, there can be some tin that is in the form of crystalline elemental tin rather than in the form of an intermetallic compound. The presence of crystalline elemental tin can deleteriously affect the capacity when the lithium ion battery is subjected to repetitive cycles of lithiation and delithiation. The nanocrystalline phase is substantially free of a stoichiometric compound such as a silicide formed by combining silicon with the sixth element. A stoichiometric compound has a defined ratio between the elements in the compound with the ratio being a rational number.

Suitable lanthanide elements include lanthanum, cerium, praseodymium, neodymium, promethium, samarium, europium, gadolinium, terbium, dysprosium, holmium, erbium, thulium, ytterbium, and lutetium. Suitable actinide elements include thorium, actinium, and protactinium. Some alloy compositions contain a lanthanide elements selected, for example, from cerium, lanthanum, praseodymium, neodymium, or a combination thereof.

The sixth element can be a mischmetal, which is an alloy of various lanthanides. Some mischmetals contains, for example, 45 to 60 weight percent cerium, 20 to 45 weight percent lanthanum, 1 to 10 weight percent praseodymium, and 1 to 25 weight percent neodymium. Other mischmetals contains 30 to 40 weight percent lanthanum, 60 to 70 weight percent cerium, less than 1 weight percent praseodymium, and less than 1 weight percent neodymium. Still other mischmetal contains 40 to 60 weight percent cerium and 40 to 60 weight percent lanthanum. The mischmetals often includes small impurities (e.g., less than 1 weight percent, less than 0.5 weight percent, or less than 0.1 weight percent) such as, for example, iron, magnesium, silicon, molybdenum, zinc, calcium, copper, chromium, lead, titanium, manganese, carbon, sulfur, and phosphorous. The mischmetal often has a lanthanide content of at least 97 weight percent, at least 98 weight percent, or at least 99 weight percent. One exemplary mischmetal that is commercially available from Alfa Aesar, Ward Hill, Mass. with 99.9 weight percent purity contains approximately 50 weight percent cerium, 18 weight percent neodymium, 6 weight percent praseodymium, 22 weight percent lanthanum, and 3 weight percent other rare earths.

The alloy composition contains at least 2 mole percent, at least 3 mole percent, or at least 5 mole percent of the sixth element. The sixth element can be present in amounts up to 15 mole percent, up to 12 mole percent, or up to 10 mole percent in the alloy composition. For example, the alloy composition can contain 3 to 15 mole percent, 5 to 15 mole percent, 3 to 12 mole percent, or 3 to 10 mole percent of the sixth element. In some embodiments, the sixth element is a lanthanide element or a mixture of lanthanide elements.

The alloy composition is substantially free of an alkaline earth metal such as calcium, barium, magnesium, and the like. As used herein, the term "substantially free" with reference to an alkaline earth metal means that the alloy composition contains no more than 1 mole percent alkaline earth, no more than 0.5 mole percent alkaline earth, no more than 0.2 mole percent alkaline earth, or no more than 0.1 mole percent alkaline earth. An alkaline earth, if present in the alloy composition, is typically present as an impurity of another component and is not purposefully added.

The alloy composition can further include an alkali metal such as lithium. Prior to the first lithiation reaction, the alloy composition typically contains little or no lithium. After the first lithiation, the amount of lithium can vary but is typically greater than zero even after the lithium ion battery has been discharged. That is, the anode containing the alloy composition often has at least a small amount of irreversible capacity.

The alloy compositions are often of Formula I:

$$Si_aAl_bT_cSn_dIn_eM_fLi_g \qquad (I)$$

where a is a number in the range of 35 to 70; b is a number in the range of 1 to 45; T is a transition metal; c is a number in the range of 5 to 25; d is a number in the range of 1 to 15; e is a number up to 15; M is yttrium, a lanthanide element, or a combination thereof; f is a number in the range of in the range of 2 to 15; and the sum of a+b+c+d+e+f is equal to 100. The variable g is a number in the range of 0 to [4.4(a+d+e)+b].

In some exemplary compositions according to Formula I, the variable a is a number in the range of 40 to 65; b is a number in the range of 1 to 25; c is a number in the range of 5 to 25; d is a number in the range of 1 to 15; e is a number up to 15; and f is a number in the range of 2 to 15. In other exemplary compositions according to Formula I, the variable a is a number in the range of 40 to 55; b is a number in the range of 25 to 45; c is a number in the range of in the range of 5 to 25; d is a number in the range of 1 to 15; e is a number up to 15; and f is a number in the range of 2 to 15. In still other exemplary compositions, the variable a is a number in the range of 55 to 65; b is a number in the range of 10 to 20; c is a number in the range of 5 to 25; d is a number in the range of 1 to 15; e is a number up to 15; and f is a number in the range of 2 to 15.

The alloy composition of the anode can be in the form of a thin film or powder, the form depending on the technique chosen to prepare the materials. Suitable methods of preparing the alloy compositions include, but are not limited to, sputtering, chemical vapor deposition, vacuum evaporation, melt processing such as melt spinning, splat cooling, spray atomization, electrochemical deposition, and ball milling.

The method of making the alloy composition often involves forming an amorphous precursor material and then annealing the precursor material at a temperature in the range of about 150° C. to about 400° C. Annealing tends to convert the precursor material that is entirely amorphous into an alloy composition that is a mixture of an amorphous phase and a nanocrystalline phase. The annealing step is typically conducted by heating the precursor material in an inert environment such as argon or helium.

Sputtering is a procedure for producing amorphous precursor. The different elements can be sputtered simultaneously or sequentially. For example, the elements can be sequentially sputter-coated on a substrate such as a copper substrate. The substrates can be positioned near the edge of a turntable (e.g., 25 inch diameter) that rotates continuously below multiple sputtering sources that are operating continuously. A layer of one material can be deposited as the substrate passes under the first sputtering source, and additional layers of different material can be deposited as the substrate passes under the other sputtering sources. The amount of material deposited from each sputtering source can be controlled by varying the rotation speed of the turntable and by varying the sputtering rates. Suitable sputtering methods are further described in U.S. Pat. No. 6,203,944 B1 (Turner et al.); U.S. Pat. No. 6,436,578 B1 (Turner et al.); and U.S. Pat. No. 6,699,336 B2 (Turner et al.), all of which are incorporated herein by reference.

Melt processing is another procedure that can be used to produce precursors or for producing alloy compositions that are a mixture of amorphous materials and nanocrystalline materials. Such processes are described generally, for example, in *Amorphous Metallic Alloys*, F. E. Luborsky, ed., Chapter 2, Butterworth & Co., Ltd., 1983. Ingots containing the reactants can be melted in a radio frequency field and then ejected through a nozzle onto a surface of a rotating wheel (e.g., a copper alloy wheel) that can be cooled. Because the surface temperature of the rotating wheel is substantially lower than the temperature of the melt, contact with the surface of the rotating wheel quenches the melt. Rapid quenching minimizes the formation of crystalline material and favors the formation of amorphous materials. Suitable melt processing methods are further described in U.S. Pat. No. 6,699,336 B2 (Turner et al.), incorporated herein by reference. The melt-processed material can be in the form, for example, of a ribbon or a thin film.

In some melt processing procedures, depending on the quenching rate and the particular material, the resulting material can be a mixture of an amorphous phase and a single nanocrystalline phase that includes an intermetallic compound of tin, indium, and the sixth element. In other melt processing procedures, however, the melt-processed material is a precursor that contains (1) an amorphous phase, (2) a ternary nanocrystalline phase that includes an intermetallic compound of tin, indium and the sixth element, and (3) a crystalline (e.g., nanocrystalline) elemental tin phase, a crystalline indium phase, a crystalline binary tin-indium phase of formula $Sn_{(1-y)}In_y$, where y is a positive number less than 1 such as, for example, $Sn_{0.8}In_{0.2}$, or a combination thereof. The crystalline elemental tin phase, crystalline indium phase, and the crystalline binary tin-indium phase can often be removed by annealing the melt-processed precursor material at a temperature in the range of about 150° C. to about 400° C. under an inert atmosphere. In still other melt processing methods, the melt-processed material is a precursor that contains only amorphous materials. The precursor can be annealed at a temperature in the range of about 150° C. to about 400° C. under an inert atmosphere to prepare the alloy composition that contains both an amorphous phase and a nanocrystalline phase.

The sputtered or melt processed alloy compositions can be further treated to produce powdered materials. For example, a ribbon or thin film of the alloy composition can be pulverized to form a powder. The powder can be formed before or after any annealing step. Exemplary powders have a maximum dimension that is no greater than 60 micrometers, no greater than 40 micrometers, or no greater than 20 micrometers. The powders often have a maximum dimension of at least 1 micrometer, at least 2 micrometers, at least 5 micrometers, or at least 10 micrometers. For example, suitable powders often have a maximum dimension of 1 to 60 micrometers, 10 to 60 micrometers, 20 to 60 micrometers, 40 to 60 micrometers, 1 to 40 micrometers, 2 to 40 micrometers, 10 to 40 micrometers, 5 to 20 micrometers, or 10 to 20 micrometers.

In some embodiments, the anode contains the alloy composition dispersed in an elastomeric polymer binder. Exemplary elastomeric polymer binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Specific examples of elastomeric polymer binders include terpolymers of vinylidene fluoride, tetrafluoroethylene, and propylene; and copolymers of vinylidene fluoride and hexafluoropropylene. Commercially available fluorinated elastomers include those sold by Dyneon, LLC, Oakdale, Minn. under the trade designation "FC-2178", "FC-2179", and "BRE-7131X".

In some anodes, the elastomeric binders are crosslinked. Crosslinking can improve the mechanical properties of the polymer and can improve the contact between the alloy composition and any electrically conductive diluent that may be present.

In other anodes, the binder is a polyimide such as the aliphatic or cycloaliphatic polyimides described in U.S. Patent Publication No. 2006/0099506 (Krause et al.). Such polyimide binders have repeating units of Formula II where $R^1$ is aliphatic or cycloaliphatic; and $R^2$ is aromatic, aliphatic, or cycloaliphatic.

The aliphatic or cycloaliphatic polyimide binders may be formed, for example, using a condensation reaction between an aliphatic or cycloaliphatic polyanhydride (e.g., a dianhydride) and an aromatic, aliphatic or cycloaliphatic polyamine (e.g., a diamine or triamine) to form a polyamic acid, followed by chemical or thermal cyclization to form the polyimide. The polyimide binders may also be formed using reaction mixtures additionally containing aromatic polyanhydrides (e.g., aromatic dianhydrides), or from reaction mixtures containing copolymers derived from aromatic polyanhydrides (e.g., aromatic dianhydrides) and aliphatic or cycloaliphatic polyanhydrides (e.g., aliphatic or cycloaliphatic dianhydrides). For example, about 10 to about 90 percent of the imide groups in the polyimide may be bonded to aliphatic or cycloaliphatic moieties and about 90 to about 10 percent of the imide groups may be bonded to aromatic moieties. Representative aromatic polyanhydrides are described, for example, in U.S. Pat. No. 5,504,128 (Mizutani et al.).

An electrically conductive diluent can be mixed with the alloy composition in the anode. Exemplary electrically conductive diluents include, but are not limited to, carbon, metal, metal nitrides, metal carbides, metal silicides, and metal borides. In some anodes, the electrically conductive diluents are carbon blacks such as those commercially available from MMM Carbon of Belgium under the trade designation "SUPER P" and "SUPER S" or from Chevron Chemical Co. of Houston, Tex. under the trade designation "SHAWINIGAN BLACK"; acetylene black; furnace black; lamp black; graphite; carbon fibers; or combinations thereof.

The anode can further include an adhesion promoter that promotes adhesion of the alloy composition and the electrically conductive diluent to the elastomeric polymer binder. The combination of an adhesion promoter and elastomeric polymer binder accommodates, at least partially, volume changes that may occur in the alloy composition during repeated cycles of lithiation and delithiation. The adhesion promoter can be part of the binder (e.g., in the form of a functional group) or can be in the form a coating on the alloy composition, the electrically conductive diluent, or a combination thereof. Examples of adhesion promoters include, but are not limited to, silanes, titanates, and phosphonates as described in U.S. Pat. No. 7,341,804, the disclosure of which is incorporated herein by reference.

The anode can be partially lithiated prior to or during the battery assembly process. Adding lithium to the anode can increase the energy delivered by the battery during discharging. In some embodiments, the anode is partially lithiated by dispersing a lithium powder, the alloy composition, and a conductive diluent in a solution of a polymer binder. The dispersion can be coated, dried to remove any solvent, and cured to form the electrode. In other embodiments, lithium foil or a lithium metal powder can be added to the surface of a previously cured electrode. In the case of a lithium metal powder, the powder can be distributed 1) by sprinkling the powder directly onto the surface of the electrode or 2) by dispersing the lithium metal powder in a volatile solvent that is non-reactive, followed by evenly coating the lithium dispersion onto the electrode surface and evaporating off the solvent. The lithium foil or lithium metal powder can then be affixed to the electrode by a calendaring process. Although anodes that contain lithium can be heated before battery assembly to react the lithium with the other components of the anode, such anodes are typically assembled into batteries without heating. During the battery assembly process, the lithium can react with the other components of the anode coating when electrolyte is added.

Any suitable electrolyte can be included in the lithium ion battery. The electrolyte can be in the form of a solid or liquid. Exemplary solid electrolytes include polymeric electrolytes such as polyethylene oxide, polytetrafluoroethylene, polyvinylidene fluoride, fluorine-containing copolymers, polyacrylonitrile, or combinations thereof. Exemplary liquid electrolytes include ethylene carbonate, fluoroethylene carbonate, dimethyl carbonate, diethyl carbonate, propylene carbonate, gamma-butyrolactone, tetrahydrofuran, 1,2-dimethoxyethane, dioxolane, 4-fluoro-1,3-dioxalan-2-one, or combinations thereof. The electrolyte includes a lithium electrolyte salt such as $LiPF_6$, $LiBF_4$, $LiClO_4$, $LiN(SO_2CF_3)_2$, $LiN(SO_2CF_2CF_3)_2$, and the like.

The electrolyte can include a redox shuttle molecule, an electrochemically reversible material that during charging can become oxidized at the cathode, migrate to the anode where it can become reduced to reform the unoxidized (or less-oxidized) shuttle species, and migrate back to the cathode. Exemplary redox shuttle molecules include those described in U.S. Pat. Nos. 5,709,968 (Shimizu), 5,763,119 (Adachi), 5,536,599 (Alamgir et al.), 5,858,573 (Abraham et al.), 5,882,812 (Visco et al.), 6,004,698 (Richardson et al.), 6,045,952 (Kerr et al.), and 6,387,571 B1 (Lain et al.); in PCT Published Patent Application No. WO 01/29920 A1 (Richardson et al.); and in U.S. Pat. Nos. 7,615,312 (Dahn et al.), 7,615,317 (Dahn et al.), 7,585,590 Wang et al.); and U.S. Patent Application Publication No. 2005-0221196A1.

Any suitable cathode known for use in lithium ion batteries can be utilized. Some exemplary cathodes include lithium transition metal oxide such as lithium cobalt dioxide, lithium nickel dioxide, and lithium manganese dioxide. Other exemplary cathodes are disclosed in U.S. Pat. No. 6,680,145 B2 (Obrovac et al.), incorporated herein by reference, and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof. These particles can be used alone or in combination with a lithium-transition metal oxide material such as lithium cobalt dioxide.

In some lithium ion batteries with solid electrolytes, the cathode can include $LiV_3O_8$ or $LiV_2O_5$. In other lithium ion batteries with liquid electrolytes, the cathode can include $LiCoO_2$, $LiCo_{0.2}Ni_{0.8}O_2$, $LiMn_2O_4$, $LiFePO_4$, or $LiNiO_2$.

The lithium ion batteries can be used as a power supply in a variety of applications. For example, the lithium ion batteries can be used in power supplies for electronic devices such as computers and various hand-held devices, motor vehicles, power tools, photographic equipment, and telecommunication devices. Multiple lithium ion batteries can be combined to provide a battery pack.

EXAMPLES

Aluminum, silicon, iron, titanium, zirconium, tin, and cobalt were obtained from Alfa Aesar, Ward Hill, Mass. or Aldrich, Milwaukee, Wis. Indium was obtained from Indium Corporation of America, Utica, N.Y. These materials had a purity of at least 99.8 weight percent. A mixture of rare earth elements, also known as mischmetal (MM), was also obtained from Alfa Aesar with 99.0 weight percent minimum rare earth content which contained approximately 50 weight percent cerium, 18 weight percent neodymium, 6 weight percent praseodymium, 22 weight percent lanthanum, and 4 weight percent other rare earth elements.

The alloy compositions were formed into electrodes and characterized in electrochemical cells using a lithium metal counter electrode.

Example 1

$Si_{60}Al_{14}Fe_8TiInSn_6(MM)_{10}$

An alloy composition $Si_{60}Al_{14}Fe_8TiInSn_6(MM)_{10}$ was prepared by mixing 17.606 g of silicon chips, 3.947 g of aluminum shot, 4.668 g of iron lumps, 0.500 g titanium sponge, 7.441 g tin shot, 1.200 g indium, and 14.639 g of mischmetal chunks. The mixture was melted together on a carbon hearth in an argon filled arc furnace purchased from Advanced Vacuum Systems, Ayer, Mass. The resulting ingot had a composition of $Si_{60}Al_{14}Fe_8TiSn_6InMm$ and was broken into pieces having dimensions of about 1 cm in all directions.

The ingots were then further processed by melt spinning in a melt-spinning apparatus that included a vacuum chamber having a cylindrical quartz glass crucible (16 mm internal diameter and 140 mm length) with a 0.35 mm orifice that was positioned above a rotating cooling wheel. The rotating cooling wheel (10 mm thick and 203 mm diameter) was fabricated from a copper alloy (Ni—Si—Cr—Cu C18000 alloy, 0.45 weight percent chromium, 2.4 weight percent nickel, 0.6 weight percent silicon with the balance being copper) that is commercially available from Nonferrous Products, Inc. from Franklin, Ind. Prior to processing, the edge surface of the cooling wheel was polished using a rubbing compound (commercially available from 3M, St. Paul, Minn. under the trade designation IMPERIAL MICROFINISHING) and then wiped with mineral oil to leave a thin film.

After placing 15 g of the ingot in the crucible, the melt spinning apparatus was evacuated to 80 mT (milliTorr) and then filled with helium gas to 200 T. The ingot was melted using radio frequency induction. As the temperature reached 1300° C., 400 T helium pressure was applied to the surface of the molten material and a sample was extruded through a nozzle onto the spinning (5031 revolutions per minute) cooling wheel. Ribbon strips were formed that had a width of 1 mm and a thickness of 10 micrometers.

Figure 1:
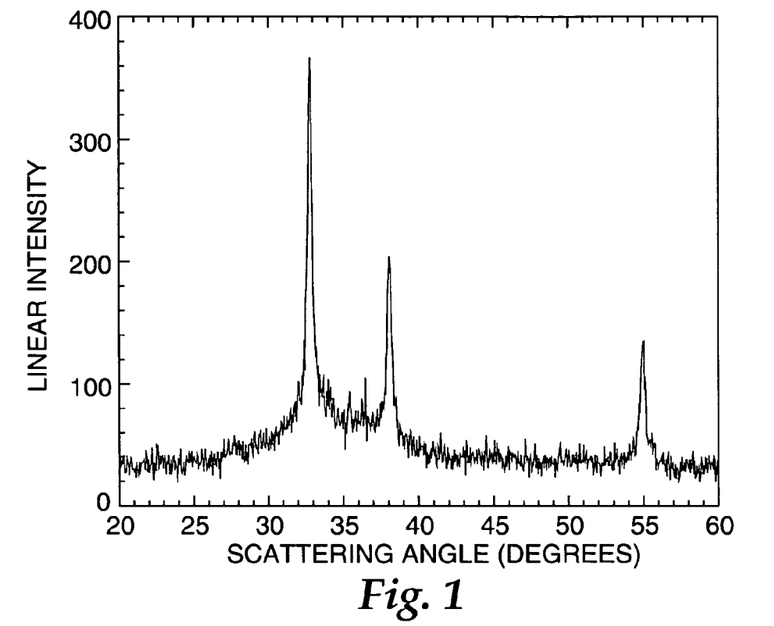
FIG. 1 is the x-ray diffraction pattern of the alloy composition $Si_{60}Al_{14}Fe_8TiInSn_6(MM)_{10}$ where MM refers to mischmetal.

FIG. 1 shows the x-ray diffraction (XRD) pattern of the resulting melt-spun ribbon sample taken with a Siemens D500 x-ray diffractometer equipped with a copper target ($K\alpha 1$, $K\alpha 2$ lines). The XRD pattern shows that the alloy contained an amorphous phase and a nanocrystalline phase. The broad hump is indicative of amorphous material and the individual peaks are of a width indicative of nanocrystalline material The XRD pattern lacks sharp peaks associated with elemental silicon, elemental tin, elemental indium, or a binary intermetallic compound of tin and indium.

The following components were added to a 40 ml tungsten carbide milling vessel containing two 10 mm diameter and ten 3 mm diameter tungsten carbide balls: 1.6 g of the above ribbon, 240 mg of carbon black (commercially available from MMM Carbon, Belgium under the trade designation SUPER P), 0.8 g of a polyimide coating solution (commercially available from HD Microsystems, Cheesequake Rd, Parlin, N.J. under the trade designation PYRALIN P12555 as a 20 weight percent solution in N-methyl-2-pyrrolidinone), and 4.2 g of N-methyl-2-pyrroline (commercially available from Aldrich, Milwaukee, Wis.). The milling vessel was placed in a planetary mill (PULVERISETTE 7, available from Fritsch GmbH, Idon-Oberstein, Germany) and the contents were milled at a setting of "3" for 1 hour.

After milling, the mixture was transferred to a notched coating bar and coated onto a 15 micrometer thick copper foil as a strip having a width of 25 mm and a thickness of 125 micrometers. The strips were cured at 150° C. under vacuum conditions for 2.5 hours to form an electrode. The electrode was then used to construct 2325 coin cells having a 300 micrometer thick metallic lithium foil counter/reference electrode, two layers of a flat sheet polypropylene membrane separator (CELGARD 2400, commercially available from CELGARD Inc., Charlotte, N.C.), and 1 M $LiPF_6$ in a 1:2 mixture of ethylene carbonate and diethyl carbonate as the electrolyte. The 2325 coin cell hardware is described in A. M. Wilson and J. R. Dahn, *J. Electrochem. Soc.*, 142, 326-332 (1995).

Figure 2:
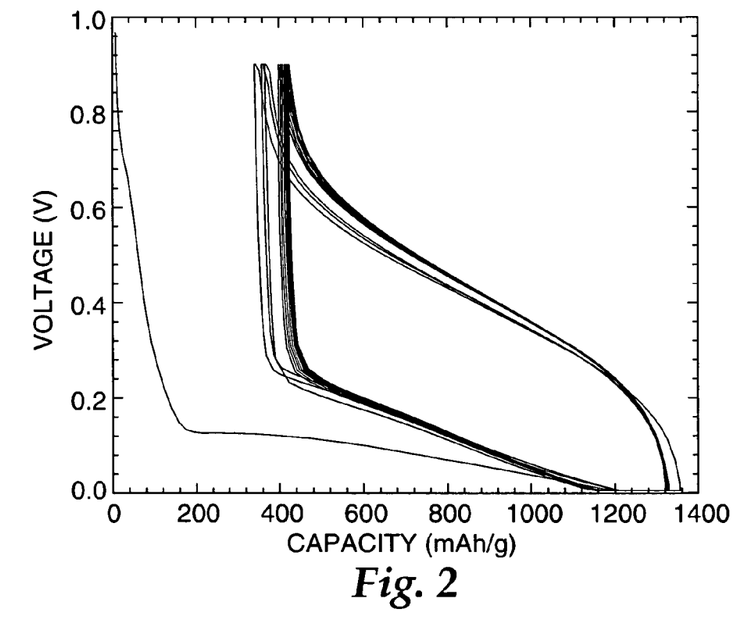
FIG. 2 is a plot of voltage versus capacity of an electrochemical cell having an electrode that contains an alloy composition $Si_{60}Al_{14}Fe_8TiInSn_6(MM)_{10}$.

Electrochemical cells were cycled between 0.9 V vs. the metallic Li/Li ion reference electrode and 5 mV vs. the metallic Li/Li ion reference electrode at a constant current of 100 mA/g (500 µA) using a cell tester (Maccor Inc., Tulsa Okla.). The current was allowed to relax to 10 mA/g (50 µA) at the lower voltage cutoff before the next charge cycle. The voltage versus capacity curve is shown in FIG. 2. The reversible specific capacity was 900 mAh/g.

Example 2

$Si_{60}Al_{14}Fe_8TiIn_3Sn_4(MM)_{10}$

Figure 3:
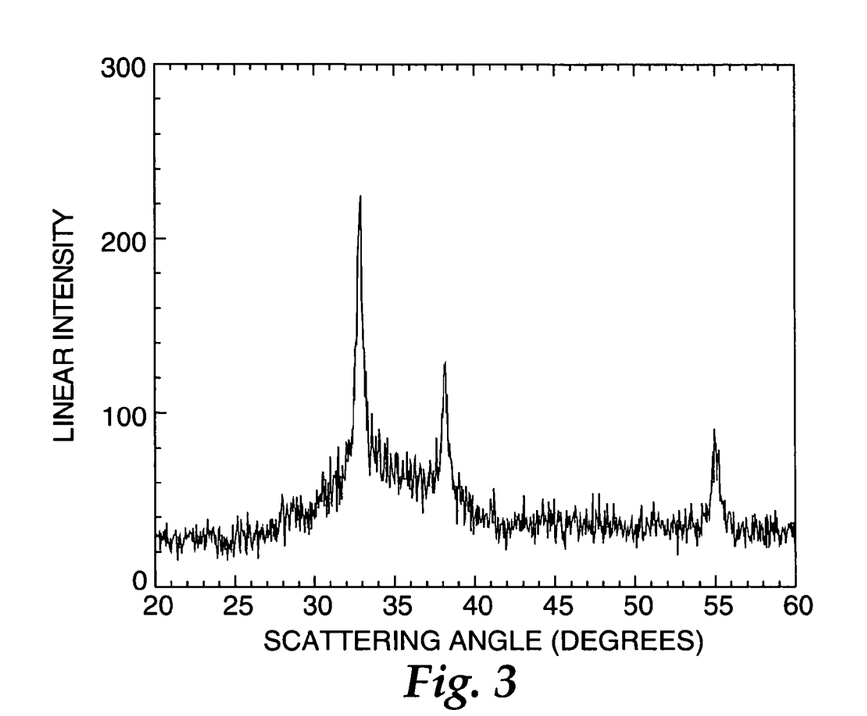
FIG. 3 is the x-ray diffraction pattern of the alloy composition $Si_{60}Al_{14}Fe_8TiIn_3Sn_4(MM)_{10}$.

An alloy composition $Si_{60}Al_{14}Fe_8TiIn_3Sn_4(MM)_{10}$ was prepared using a procedure similar to Example 1 by mixing 17.634 g of silicon chips, 3.953 g of aluminum shot, 4.675 g of iron lumps, 0.501 g titanium sponge, 4.969 g tin shot, 3.605 g indium, and 14.663 g of mischmetal. The resulting melt-spun ribbon was annealed by heating at 200° C. for 2 hours under flowing argon. FIG. 3 shows the XRD pattern.

Figure 4:
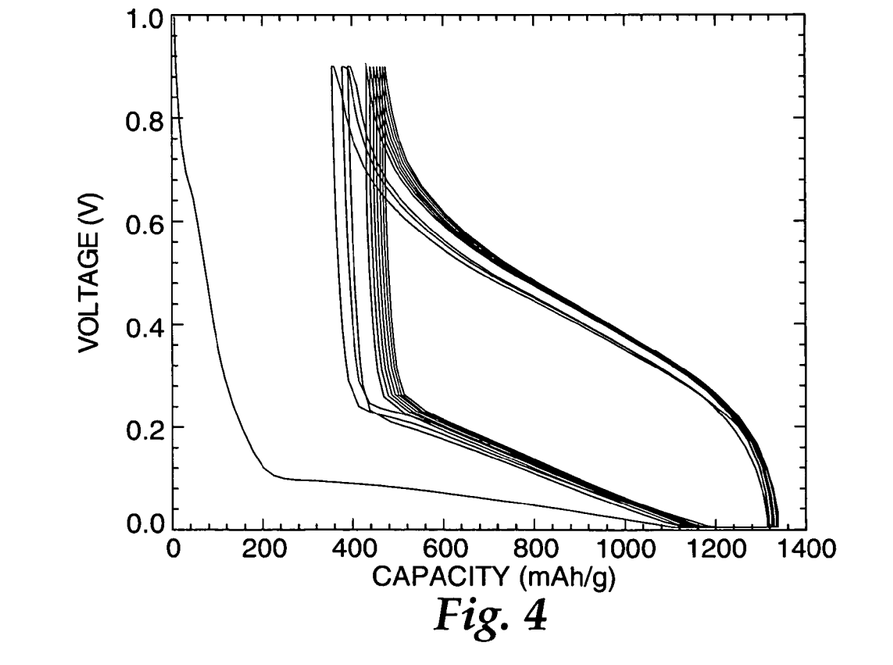
FIG. 4 is a plot of voltage versus capacity of an electrochemical cell having an electrode that contains an alloy composition $Si_{60}Al_{14}Fe_8TiIn_3Sn_4(MM)_{10}$.

The resulting alloy composition was tested in electrochemical cells as described in Example 1. An electrochemical cell was prepared using the procedure described in Example 1. The voltage versus capacity curve of this material is shown in FIG. 4. The reversible specific capacity was 950 mAh/g.

Example 3

$Si_{59}Al_{16}Fe_8In_1Sn_6(MM)_{10}$

An alloy composition $Si_{59}Al_{16}Fe_8In_1Sn_6(MM)_{10}$ was prepared using a procedure similar to Example 1 by mixing 9.062 g aluminum, 34.785 g silicon, 9.379 g iron, 2.410 g indium, 14.949 g tin, and 29.414 g mischmetal. The melt spinning was at 1350° C.

Figure 5:
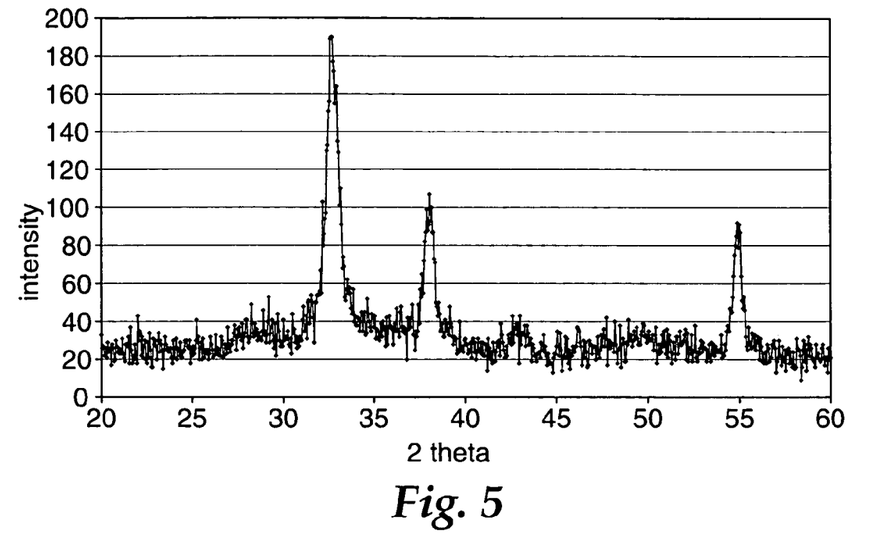
FIG. 5 is the x-ray diffraction pattern of the alloy composition $Si_{59}Al_{16}Fe_8InSn_6(MM)_{10}$.

10 g of the melt-spun ribbon was annealed for 2 hrs at 200° C. in a tube furnace under a flow of argon. The XRD pattern of the resulting alloy composition is shown in FIG. 5.

The following components were added to a 40 ml tungsten carbide milling vessel containing two 10 mm diameter carbide balls and ten 3 mm diameter tungsten carbide balls: 1.70 g of the above melt-spun ribbon, 100 mg of SUPER P carbon (available from MMM Carbon, Belgium), 1.0 g of a polyimide coating solution (commercially available from HD Microsystems, Cheesequake Rd, Parlin, N.J. under the trade designation PYRALIN PI2555 as a 20 weight percent solution in N-methyl-2-pyrrolidinone), and 5.2 g of N-methyl-2-pyrrolidinone (commercially available from Aldrich, Milwaukee, Wis.). The milling vessel was placed in a planetary mill (PULVERISETTE 7, commercially available from Fritsch GmbH, Idon-Oberstein, Germany) and the contents were milled at a setting of "4" for one hour.

Figure 6:
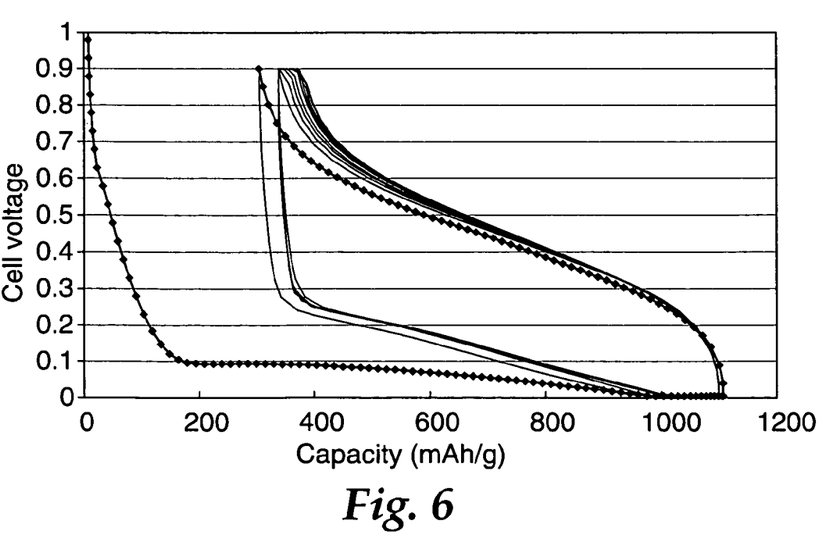
FIG. 6 is a plot of voltage versus capacity of an electrochemical cell having an electrode that contains an alloy composition $Si_{59}Al_{16}Fe_8InSn_6(MM)_{10}$.

After milling the solution was transferred to a notch coating bar and coated onto a copper foil having a thickness 15 micrometers. The coated strip had a width of 25 mm and a thickness of 125 micrometers. The coating was cured at 150° C. under a vacuum for 2.5 hours. Electrochemical cells were prepared as described in Example 1. The voltage versus capacity curve is shown in FIG. 6. The reversible specific capacity was 750 mAh/g.

Example 4

Figure 7:
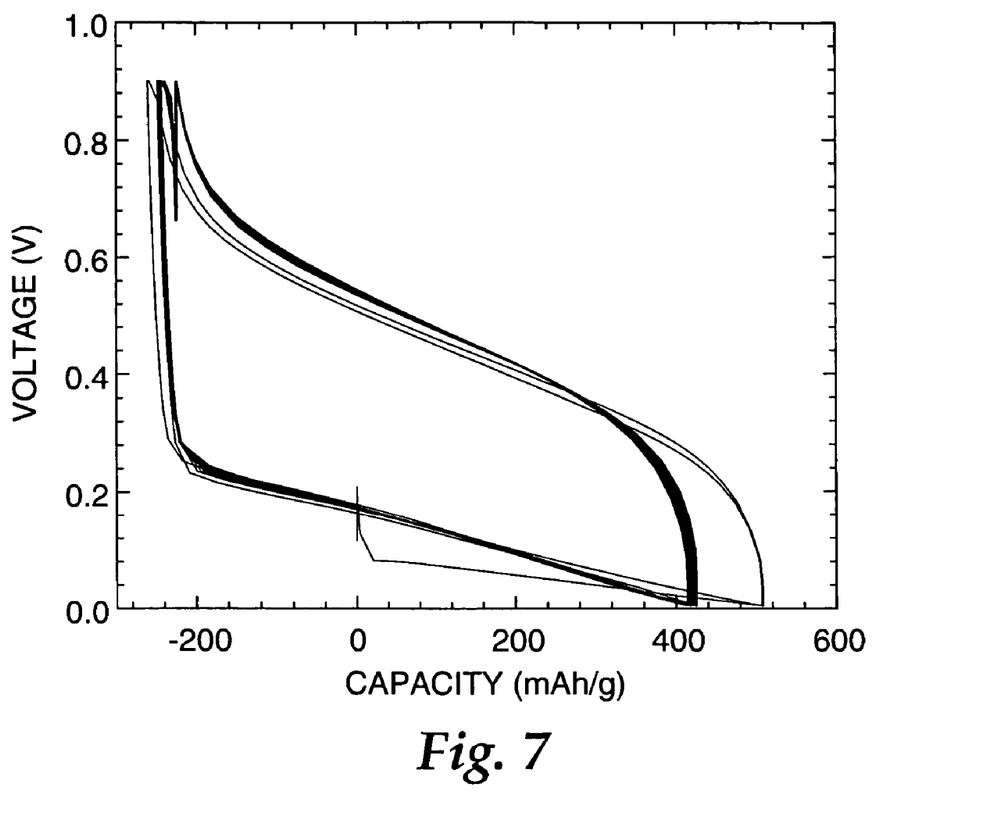
FIG. 7 is a plot of voltage versus capacity of an electrochemical cell having an electrode that contain lithium powder and an alloy composition $Si_{60}Al_{14}Fe_8TiInSn_6(MM)_{10}$.

Lithium metal powder was made by chopping 150 micrometer thick lithium foil repeatedly with a razor blade until the maximum dimension of the individual particles were about 150 micrometers. 0.80 mg of the lithium powder was sprinkled onto a piece cut from the cured electrode described in Example 1 containing 5.84 mg of $Si_{60}Al_{14}Fe_8TiInSn_6(MM)_{10}$. The electrode was then placed in-between two pieces of polyethylene film and calendared by means of a hand roller. The resulting electrode was assembled into an electrochemical cell versus a lithium counter electrode as described in Example 1. The cell was cycled between 0.9 V vs. a metallic $Li/Li^+$ reference electrode and 5 mV vs. Li metal Li/Li ion reference electrode at a constant current of 100 mA/g using a cell tester (Maccor Inc., Tulsa Okla.). The voltage versus capacity curve is shown in FIG. 7. The reversible specific capacity was 650 mAh/g.

We claim:

1. A lithium ion battery comprising a cathode, an anode, and an electrolyte in electrical communication with both the anode and the cathode, wherein the anode comprises an alloy composition comprising
    a) silicon in an amount of 35 to 70 mole percent;
    b) aluminum in an amount of 1 to 45 mole percent;
    c) a transition metal in an amount of 5 to 25 mole percent;
    d) tin in an amount of 1 to 15 mole percent;
    e) indium in an amount up to 15 mole percent; and
    f) a sixth element comprising yttrium, a lanthanide element, an actinide element, or a combination thereof in an amount of 2 to 15 mole percent,
    wherein each mole percent is based on a total number of moles of all elements except lithium in the alloy composition;
    wherein the alloy composition is a mixture of an amorphous phase comprising silicon and a nanocrystalline phase comprising an intermetallic compound with tin, indium, and the sixth element, and
    wherein the nanocrystalline phase comprises crystalline materials having a maximum dimension of about 5 to about 50 nanometers.

2. The lithium ion battery of claim 1, wherein the amorphous phase further comprises aluminum and the transition metal.

3. The lithium ion battery of claim 1, wherein the sixth element comprises cerium, lanthanum, praseodymium, neodymium, or a combination thereof.

4. The lithium ion battery of claim 1, wherein the nanocrystalline phase is substantially free of silicon.

5. The lithium ion battery of claim 1, wherein the nanocrystalline phase is substantially free of elemental tin, elemental indium, a binary tin-indium compound, or a combination thereof.

6. The lithium ion battery of claim 1, wherein the alloy composition further comprises less than 1 mole percent alkaline earth metal.

7. The lithium ion battery of claim 1, wherein the alloy composition further comprises an alkaline metal.

8. The lithium ion battery of claim 1, wherein the alloy composition comprises particles having a maximum average dimension of 1 to 60 micrometers.

9. The lithium ion battery of claim 1, wherein the alloy composition has a single amorphous phase and a single nanocrystalline phase.

10. The lithium ion battery of claim 1, wherein the alloy composition is of Formula I $$Si_aAl_bT_cSn_dIn_eM_fLi_g \qquad (I)$$

wherein
    a is a in the range of 35 to 70;
    b is a number in the range of 1 to 45;
    T is a transition metal;
    c is a number in the range of 5 to 25;
    d is a number in the range of 1 to 15;
    e is a number up to 15;
    M is yttrium, a lanthanide element, an actinide element, or a combination thereof;

f is a number in the range of 2 to 15;

the sum of a+b+c+d+e+f is equal to 100; and g is a number in the range of 0 to [4.4(a+d+e)+b].

11. The lithium ion battery of claim 10, wherein the variable a is a number in the range of 40 to 65; b is a number in the range of 1 to 25; c is a number in the range of 5 to 25; d is a number in the range of 1 to 15; e is a number up to 15; and f is a number in the range of 2 to 15.

12. The lithium ion battery of claim 10, wherein the variable a is a number in the range of 40 to 55; b is a number in the range of 25 to 45; c is a number in the range of 5 to 25; d is a number in the range of 1 to 15; e is a number up to 15; and f is a number in the range of 2 to 15.

13. The lithium ion battery of claim 10, wherein the variable a is a number in the range of 55 to 65; b is a number in the range of 10 to 20; c is a number in the range of 5 to 25; d is a number in the range of 1 to 15; e is a number up to 15; and f is a number in the range of 2 to 15.

14. The lithium ion battery of claim 10, wherein the anode further comprises an organic binder comprising a polyimide.

15. The lithium ion battery of claim 1, wherein the anode further comprises lithium metal.

16. A battery pack comprising at least one lithium ion battery according to claim 1.

17. A method of preparing a lithium ion battery, said method comprising:

providing an anode comprising an alloy composition comprising a) silicon in an amount of 35 to 70 mole percent;

b) aluminum in an amount of 1 to 45 mole percent;

c) a transition metal in an amount of 5 to 25 mole percent;

d) tin in an amount of 1 to 15 mole percent;

e) indium in an amount up to 15 mole percent; and f) yttrium, a lanthanide element, an actinide element, or a combination thereof in an amount of 2 to 15 mole percent, wherein each mole percent is based on a total number of moles of all elements except lithium in the alloy composition and wherein the alloy composition is a mixture of an amorphous phase comprising silicon and a nanocrystalline phase comprising an intermetallic compound with tin, indium, and the sixth element; and providing a cathode and an electrolyte, wherein the electrolyte is in electrical communication with both the cathode and the anode, wherein the nanocrystalline phase comprises crystalline materials having a maximum dimension of about 5 to about 50 nanometers.

18. The method of claim 17, wherein providing the alloy composition comprises melt spinning the silicon, aluminum, tin, the transition metal element, and the sixth element.

19. The method of claim 17, wherein providing the alloy composition comprises initially forming a totally amorphous precursor material and then annealing the precursor material to prepare the mixture of the amorphous phase and the nanocrystalline phase.

20. The method of claim 17, wherein providing the alloy comprises:

forming a precursor material that comprises (i) amorphous material;

(ii) the nanocrystalline phase comprising tin, indium, and the sixth element;

(iii) at least one additional crystalline phase that contains elemental tin, elemental indium, binary tin-indium, or a combination thereof; and annealing the precursor material to remove the additional crystalline phase.

21. The method of claim 17, wherein the nanocrystalline phase is substantially free of silicon.

22. An alloy composition comprising a) silicon in an amount of 35 to 70 mole percent;

b) aluminum in an amount of 1 to 45 mole percent;

c) a transition metal in an amount of 5 to 25 mole percent;

d) tin in an amount of 1 to 15 mole percent;

e) indium in an amount up to 15 mole percent; and f) a sixth element comprising yttrium, a lanthanide element, an actinide element, or a combination thereof in an amount of 2 to 15 mole percent, wherein each mole percent is based on a total number of moles of all elements except lithium in the alloy composition; and the alloy composition is a mixture of an amorphous phase comprising silicon and a nanocrystalline phase comprising an intermetallic compound with (1) tin, (2) indium, and (3) the sixth element, wherein the nanocrystalline phase comprises crystalline materials having a maximum dimension of about 5 to about 50 nanometers.

* * * * *

UNITED STATES PATENT AND TRADEMARK OFFICE
CERTIFICATE OF CORRECTION

Page 1 of 1

PATENT NO. : 7,871,727 B2
APPLICATION NO. : 11/387219
DATED : January 18, 2011
INVENTOR(S) : Mark Nikolas Obrovac It is certified that error appears in the above-identified patent and that said Letters Patent is hereby corrected as shown below:

Column 13,
Line 1, delete "Wang" and insert --(Wang--, therefor.

Column 14,
Line 40, delete "P12555" and insert --PI2555--, therefor.

Column 18,
Lines 40-41, Claim 22, delete "(1) tin, (2) indium, and (3)" and insert --tin, indium, and--, therefor.

Signed and Sealed this
Thirteenth Day of March, 2012

David J. Kappos
*Director of the United States Patent and Trademark Office*